US012652367B2

(12) United States Patent
Nomura

(10) Patent No.: US 12,652,367 B2
(45) Date of Patent: Jun. 9, 2026

(54) DYNAMIC IMAGE DISPLAY DEVICE, DYNAMIC IMAGE DISPLAY METHOD AND RECORDING MEDIUM

(71) Applicant: Konica Minolta, Inc., Tokyo (JP)

(72) Inventor: Seiji Nomura, Hino (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 18/962,160

(22) Filed: Nov. 27, 2024

(65) Prior Publication Data

US 2025/0184444 A1     Jun. 5, 2025

(30) Foreign Application Priority Data

Dec. 5, 2023     (JP) ................................. 2023-205182

(51) Int. Cl.
*H04N 7/01*          (2006.01)
(52) U.S. Cl.
CPC ......... *H04N 7/0135* (2013.01); *H04N 7/0127* (2013.01)
(58) Field of Classification Search
CPC .... H04N 7/0135; H04N 7/0127; H04N 23/30; A61B 6/486; A61B 6/5264; A61B 6/461; A61B 8/461; G06V 10/751

USPC ......................................................... 348/441
See application file for complete search history.

(56) References Cited

U.S. PATENT DOCUMENTS

| | | | |
|---|---|---|---|
| 8,471,959 B1 * | 6/2013 | Zhang ................. | H04N 7/0127 |
| | | | 348/441 |
| 9,386,266 B2 * | 7/2016 | Parkhomenko ......... | G06F 18/23 |
| 11,295,427 B2 * | 4/2022 | Woodall .................... | G06T 5/50 |
| 11,461,900 B2 * | 10/2022 | Nagatsuka ........... | G06T 7/0012 |
| 2018/0260955 A1 * | 9/2018 | Matsutani ................ | G06T 7/38 |

FOREIGN PATENT DOCUMENTS

JP          2019-005013 A     1/2019

* cited by examiner

*Primary Examiner* — John W Miller
*Assistant Examiner* — Omer Khalid
(74) *Attorney, Agent, or Firm* — LUCAS & MERCANTI, LLP

(57) ABSTRACT

A dynamic image display device includes a hardware processor and a display. The hardware processor acquires a first dynamic image captured at a first frame rate and a second dynamic image captured at a second frame rate lower than the first frame rate, and generates an interpolation image between each frame image of the second dynamic image and increases a frame rate of the second dynamic image. The display that displays the first dynamic image and the second dynamic image that includes the interpolation image in a comparable manner.

11 Claims, 3 Drawing Sheets

D1

EXAMINATION ON CURRENT DAY     PAST EXAMINATION

INTERPOLATION IMAGE     I

```
IMAGE DISPLAY PROCESS
          |
          v
ACQUIRE FIRST DYNAMIC IMAGE                          S1
          |
          v
ACQUIRE SECOND DYNAMIC IMAGE                         S2
          |
          v
GENERATE INTERPOLATION IMAGE OF                      S3
SECOND DYNAMIC IMAGE
          |
          v
DISPLAY FIRST DYNAMIC IMAGE AND                      S4
SECOND DYNAMIC IMAGE WHICH
INCLUDES INTERPOLATION IMAGE
          |
          v
        END
```

D1

EXAMINATION ON CURRENT DAY          PAST EXAMINATION

DYNAMIC IMAGE DISPLAY DEVICE, DYNAMIC IMAGE DISPLAY METHOD AND RECORDING MEDIUM

CROSS-REFERENCE TO RELATED APPLICATIONS

The entire disclosure of Japanese Patent Application No. 2023-205182, filed on Dec. 5, 2023, is incorporated herein by reference in its entirety.

BACKGROUND OF THE INVENTION

Technical Field

The present invention relates to a dynamic image display device, a dynamic image display method, and a recording medium.

Description of Related Art

Conventionally, a user such as a doctor may perform a case examination by comparing a dynamic image captured at a first frame rate with a dynamic image captured at another second frame rate.

Japanese Unexamined Patent Publication No. 2019-5013 describes a method in which, in a case of comparing dynamic images with different frame rates, frames of one of the dynamic images are thinned out to adjust the frame rates of the dynamic images.

In the method described in Japanese Unexamined Patent Publication No. 2019-5013, the frame rate between dynamic images is adjusted to the lower frame rate.

Therefore, even if the frame rate of each dynamic image is improved, the accuracy of comparison between dynamic images at a low frame rate is not improved, and the accuracy of case examination is not improved.

SUMMARY OF THE INVENTION

It is an object of the present invention to provide a dynamic image display device, a dynamic image display method, and a recording medium that can more accurately compare dynamic images at different frame rates.

To achieve at least one of the abovementioned objects, according to an aspect of the present invention, a dynamic image display device reflecting one aspect of the present invention includes, a hardware processor, wherein the hardware processor, acquires a first dynamic image captured at a first frame rate and a second dynamic image captured at a second frame rate lower than the first frame rate, and generates an interpolation image between each frame image of the second dynamic image and increases a frame rate of the second dynamic image, and a display that displays the first dynamic image and the second dynamic image that includes the interpolation image in a comparable manner.

Further, according to another aspect of the present invention, a dynamic image display method is performed in a dynamic image display device that displays a dynamic image, the method including:

acquiring a first dynamic image captured at a first frame rate and a second dynamic image captured at a second frame rate lower than the first frame rate;

generating an interpolation image between each frame image of the second dynamic image and increasing a frame rate of the second dynamic image; and displaying the first dynamic image and the second dynamic image that includes the interpolation image in a comparable manner.

Further, according to another aspect of the present invention, a non-transitory computer-readable recording medium storing a program that causes a hardware processor of a computer of a dynamic image display device that displays a dynamic image to perform:

acquiring a first dynamic image captured at a first frame rate and a second dynamic image captured at a second frame rate lower than the first frame rate;

generating an interpolation image between each frame image of the second dynamic image and increasing a frame rate of the second dynamic image; and displaying on a display the first dynamic image and the second dynamic image that includes the interpolation image in a comparable manner.

BRIEF DESCRIPTION OF THE DRAWINGS

The advantages and features provided by one or more embodiments of the invention will become more fully understood from the detailed description given hereinafter and the appended drawings which are given by way of illustration only, and thus are not intended as a definition of the limits of the present invention, and wherein.

DETAILED DESCRIPTION

Hereinafter, one or more embodiments of the present invention will be described with reference to the drawings. However, the scope of the invention is not limited to the disclosed embodiments.

In the following, embodiments of the present invention will be described in detail with reference to the drawings. However, the scope of the invention is not limited to the illustrated examples.

[Configuration of Dynamic Image Display System 100]

Figure 1:
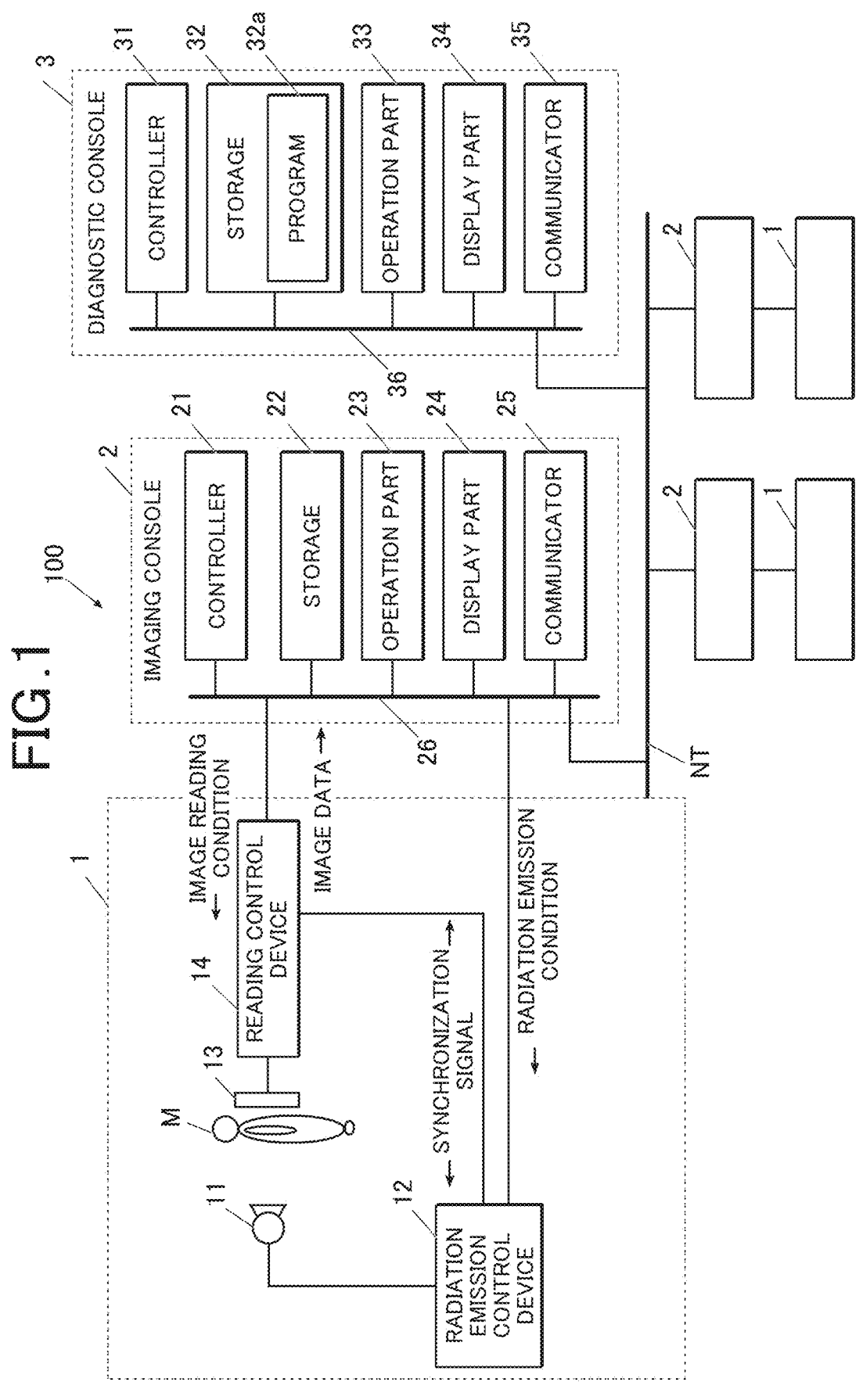
FIG. 1 is a diagram illustrating an overall configuration of a dynamic image display system in an embodiment of the present invention.

FIG. 1 shows an overall configuration of a dynamic image display system 100 according to the present embodiment.

As shown in FIG. 1, the dynamic image display system 100 is configured such that an imaging device 1 and an imaging console 2 are connected by a communication cable or the like, and the imaging console 2 and a diagnostic console 3 as a dynamic image display device are connected via a communication network NT such as a local area network (LAN).

[Configuration of Imaging Device 1]

The imaging device 1 is, for example, an imaging unit that images a dynamic state of a subject having periodicity, such as a change in form of expansion and contraction of lungs due to respiratory motion and pulsation of a heart.

Dynamic imaging is performed by repeatedly emitting pulsed radiation, such as X-rays, to a subject at intervals of a predetermined time (pulse emission) or continuously emitting radiation without a break to a subject at a low dose rate (continuous emission), thereby generating a plurality of images. That is, the dynamic imaging means that the dynamic state of a target portion having periodicity is continuously radiographed along the time axis.

Note that the dynamic imaging may be performed using not only radiation such as X-rays but also ultrasound waves or magnetism. The dynamic imaging includes moving image capturing, but does not include capturing of a still image while displaying a moving image.

A series of images obtained by dynamic imaging is referred to as a dynamic image.

The dynamic image can be acquired by imaging using a semiconductor image sensor such as a flat panel detector (FPD), for example.

Further, examples of a dynamic image includes a moving image but does not include still images captured while displaying a moving image.

Images constituting a dynamic image are called frame images. In the embodiment(s) described below, dynamic imaging of a chest is performed by pulse emission as an example. In the following embodiment(s), a case in which a subject M is a chest of a person who is the target of the examination is described as an example, but the present invention is not limited thereto.

A radiation source 11 is disposed at a position facing a radiation detector 13 with the subject M interposed therebetween. The radiation source 11 irradiates the subject M with radiation (X-rays) under the control of a radiation emission control device 12.

The radiation emission control device 12 is connected to the imaging console 2 and controls the radiation source 11 on the basis of radiation emission conditions input from the imaging console 2 to perform radiography.

The radiation emission conditions include, for example, a pulse rate, a pulse width, a pulse interval, the number of imaging frames per imaging, a value of an X-ray tube current, a value of an X-ray tube voltage, and a type of an additional filter.

The pulse rate is the number of times that radiation is emitted per second, and matches a frame rate described below. The pulse width is a period of time (duration) of one radiation emission. The pulse interval is a period of time from start of one radiation emission to start of the next radiation emission, and matches a frame interval described below.

The radiation detector 13 is constituted of a semiconductor image sensor such as an FPD.

The FPD includes, for example, a glass substrate, and a plurality of detection elements (pixels) are arranged in a matrix at predetermined positions on the substrate. The detection elements detect radiation emitted from the radiation source 11 and transmitted through at least the subject M in accordance with an intensity of the radiation, convert the detected radiation into electric signals, and accumulate the electric signals.

Each pixel includes a switching portion such as a thin film transistor (TFT), for example.

There are an indirect conversion FPD that converts X-rays into electric signals with photoelectric conversion element(s) via scintillator(s) and a direct conversion FPD that directly converts X-rays into electric signals. Either of these can be used.

According to the present embodiment, the pixel value (signal value) of the image data generated in the radiation detector 13 is a density value and is higher as the amount of transmitted radiation is greater.

The radiation detector 13 is arranged so as to face the radiation source 11 with the subject M in between.

A reading control device 14 is connected to the imaging console 2.

The reading control device 14 controls the switching portion of each pixel of the radiation detector 13 on the basis of the image reading condition input from the imaging console 2, switches the reading of the electric signal accumulated in each pixel, reads the electric signal accumulated in the radiation detector 13, and acquires image data. This image data is a frame image.

Then, the reading control device 14 assigns an identification ID and a frame number, and outputs the acquired frame image to the imaging console 2.

The image reading condition is, for example, a frame rate, a frame interval, a pixel size, an image size (matrix size), or the like.

The frame rate is the number of frame images acquired per second, and matches with the pulse rate. The frame interval is the time from the start of the operation of acquiring one frame image to the start of the operation of acquiring the next frame image, and matches with the pulse interval.

Here, the radiation emission control device 12 and the reading control device 14 are connected to each other and exchange synchronization signals with each other to synchronize the radiation emission operation and the image reading operation.

[Configuration of Imaging Console 2]

The imaging console 2 outputs radiation emission conditions and image reading conditions to the imaging device 1 to control the radiography and the reading of the radiation image by the imaging device 1.

As illustrated in FIG. 1, the imaging console 2 includes a controller 21 (hardware processor), a storage 22, an operation part (operator) 23, a display part (display) 24, and a communicator 25, and these components are connected to each other by a bus 26.

The controller 21 includes a central processing unit (CPU), a random access memory (RAM), and the like. The CPU of the controller 21 reads a system program and various processing programs stored in the storage 22 according to the operation of the operation part 23, develops the programs in the RAM, executes various processes including an imaging control process according to the developed programs, and centrally controls the operation of each unit of the imaging console 2 and the radiation irradiation operation and the reading operation of the imaging device 1.

The storage 22 includes a nonvolatile semiconductor memory, a hard disk and the like. The storage 22 stores various programs executed by the controller 21, parameters necessary for execution of processing by the programs, or data such as processing results. For example, the storage 22 stores a program for executing imaging control processing. The various programs are stored in the form of readable program codes, and the controller 21 sequentially executes operations according to the program codes.

Specifically, the storage 22 stores a series of frame images (dynamic images) which are output from the imaging device 1 and to which identification IDs and frame numbers are assigned.

The storage 22 also stores imaging order information. The imaging order information is attached to a series of frame images (dynamic images) and stored in the storage 22.

The imaging order information includes radiation emission conditions (described above), image reading conditions (described above), information regarding a person as a target of the examination, examination information, and the like.

The information regarding the target of the examination includes, for example, the name, height, weight, age, and sex of the target.

The examination information is, for example, an imaging site (chest or the like), a diagnosis target (ventilation, pulmonary blood flow, or the like), or the like.

The operation part 23 includes a keyboard including cursor keys, number input keys, and various function keys, and a pointing device such as a mouse, and outputs, to the controller 21, an instruction signal input by a key operation on the keyboard or a mouse operation. Furthermore, the operation part 23 may include a touch screen on the display screen of the display part 24, and in this case, outputs an instruction signal input via the touch screen to the controller 21.

The person who performs the imaging inputs the imaging order information by using the operation part 23.

The display part 24 is configured by a monitor such as a liquid crystal display (LCD) and a cathode ray tube (CRT), and displays an input instruction from the operation part 23, data, and the like according to an instruction of a display signal input from the controller 21.

The communicator 25 includes a LAN adapter, a modem, a terminal adapter (TA), and the like, and controls data transmission and reception to and from each device connected to the communication network NT.

[Configuration of Diagnostic Console 3]

The diagnostic console 3 (dynamic image display device) acquires the dynamic image from the imaging console 2 and displays the dynamic image. As described above, the dynamic image is accompanied by the imaging order information.

As shown in FIG. 1, the diagnostic console 3 is configured to include a controller 31 (hardware processor), a storage 32, an operation part 33, a display part 34, and a communicator 35, and each unit is connected by a bus 36.

The controller 31 includes a CPU, a RAM, and the like. In response to operation of the operation part 33, the CPU of the controller 31 reads a system program or various processing programs stored in the storage 32, loads the program in the RAM, and executes various processes in accordance with the loaded program. The CPU of the controller 31 reads a program 32a stored in the storage 32, loads the program 32a to the RAM, and executes image display processing (described below) according to the loaded program 32a.

Furthermore, the controller 31 functions as a dynamic image acquirer that acquires a first dynamic image captured at a first frame rate and a second dynamic image captured at a second frame rate lower than the first frame rate.

Furthermore, the controller 31 functions as an interpolation image generator that generates interpolation images between the respective frame images of the second dynamic image and makes the frame rate of the second dynamic image equal to the first frame rate.

Furthermore, the controller 31 functions as a display controller that causes the display part to display the first dynamic image and the second dynamic image including the interpolation image in a comparable manner.

The storage 32 includes a nonvolatile semiconductor memory, a hard disk and the like. The storage 32 stores a program 32a for executing image display processing in the controller 31, various programs, parameters necessary for execution of processing by the programs, processing results, and the like. These various programs are stored in the form of readable program codes, and the controller 31 sequentially executes operations in accordance with the program codes.

Furthermore, the storage 32 stores the dynamic images acquired from the imaging console 2 and accompanying imaging order information.

The operation part 33 includes a keyboard including cursor keys, number input keys, and various function keys, and a pointing device such as a mouse, and outputs, to the controller 31, an instruction signal input by a key operation on the keyboard or a mouse operation. Furthermore, the operation part 33 may include a touch screen on the display screen of the display part 34, and in this case, outputs an instruction signal input via the touch screen to the controller 31.

The display part 34 includes a monitor such as an LCD or a CRT, and performs various displays in accordance with an instruction of a display signal input from the controller 31.

The display part 34 functions as a display part for comparably displaying the first dynamic image and the second dynamic image that includes the interpolation image.

The communicator 35 includes a LAN adapter, a modem, a TA, and the like, and controls data transmission and reception to and from each device connected to the communication network NT.

[Image Display Processing]

Figure 2:
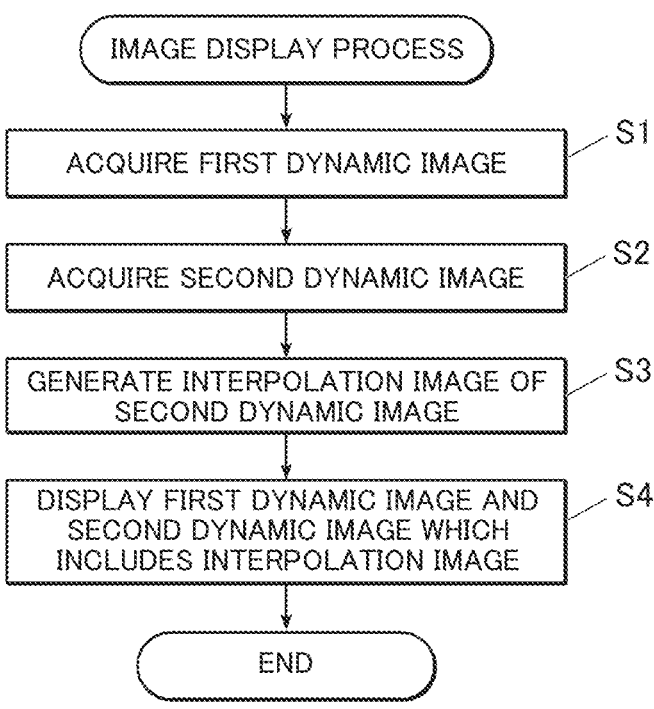
FIG. 2 is a flowchart illustrating image display processing.

Next, image display processing in the diagnostic console 3 will be described with reference to FIG. 2.

The image display processing is processing in which dynamic images having different frame rates are displayed in a comparable manner by generating corrected images between the frames of the dynamic image having a lower frame rate.

One of the dynamic images is referred to as a first dynamic image captured at a first frame rate. The other dynamic image is set as a second dynamic image captured at a second frame rate lower than the first frame rate.

Furthermore, it is desirable that the interpolation image be generated such that the frame rate of the second dynamic image is the same as the first frame rate. Even if they are not the same, the interpolation image may be generated so as to increase the frame rate of the second dynamic image.

First, the controller 31 acquires the first dynamic image from the storage 32 (step S1).

Next, the controller 31 acquires the second dynamic image from the storage 32 (step S2).

Next, the controller 31 generates the interpolation image of the second dynamic image (step S3). Next, the controller 31 adds the interpolation image to the second dynamic image.

Here, a specific interpolation method will be described.

For example, an interpolation method using a sine wave will be described.

First, the pixel values of the respective frame images are plotted on a graph in which the vertical axis represents the pixel values of the respective frame images and the horizontal axis represents the time for which the respective frame images have been captured (capturing time).

Next, the temporal change of the pixel value is approximated using the sine wave. This is because the dynamic image is an image continuously captured at a certain frame rate, and thus the pixel value smoothly changes over time.

Finally, pixel values at certain times between the respective capturing times are acquired, and the acquired pixel values are arranged to generate the interpolation image.

Further, for example, linear interpolation will be described.

In the linear interpolation, it is assumed that the pixel value changes linearly between frame images, the pixel value at a certain time between respective capturing times is acquired, and the acquired pixel values are arranged to generate the interpolation image.

In this case, the processing becomes lighter than interpolation using the sine wave.

Furthermore, for example, when the frame rate of the first dynamic image is twice the frame rate of the second dynamic image, the interpolation image between adjacent frame images can be generated by averaging the pixel values of the adjacent frame images.

In this case, processing becomes lighter than interpolation using the sine wave or linear interpolation.

In addition, for example, interpolation may be performed using machine learning.

A model that has learned the characteristics of changes in the pixel values of each frame image in advance is created and stored in the storage 32, and the model is used to calculate the interpolation image between each frame image.

Next, the controller 31 causes the display part 34 to display the second dynamic image including the first dynamic image and the interpolation image (step S4).

Specifically, when displaying the second dynamic image including the interpolation image, the controller 31 displays information indicating that the second dynamic image includes the interpolation image.

Figure 3:
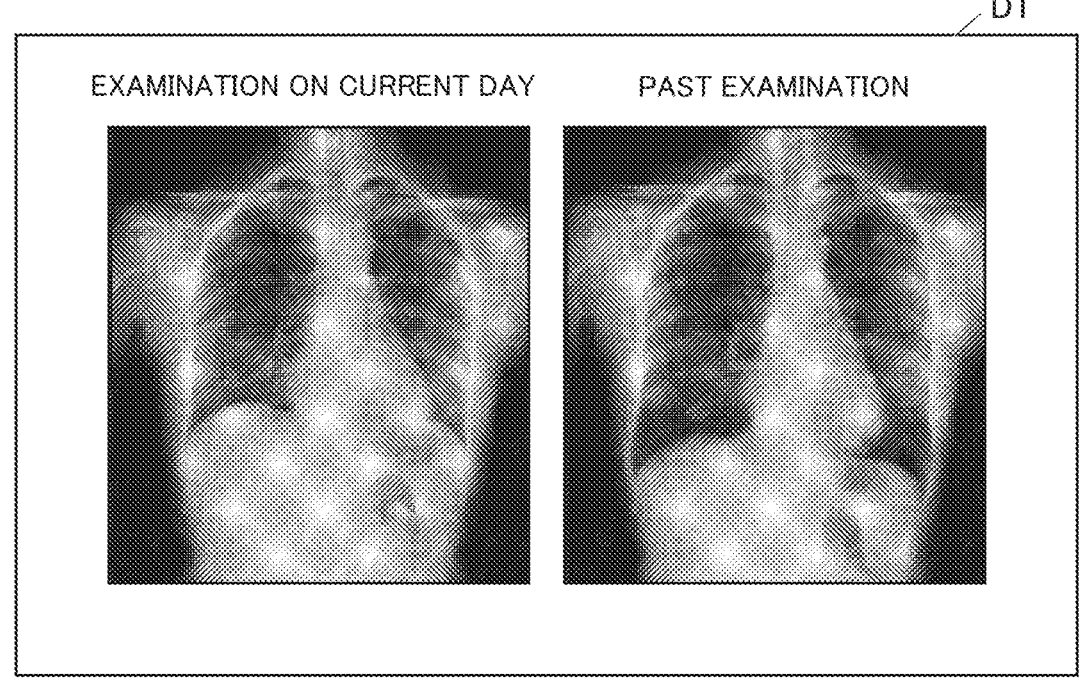
FIG. 3 is an image diagram of a display screen.
Figure 4:
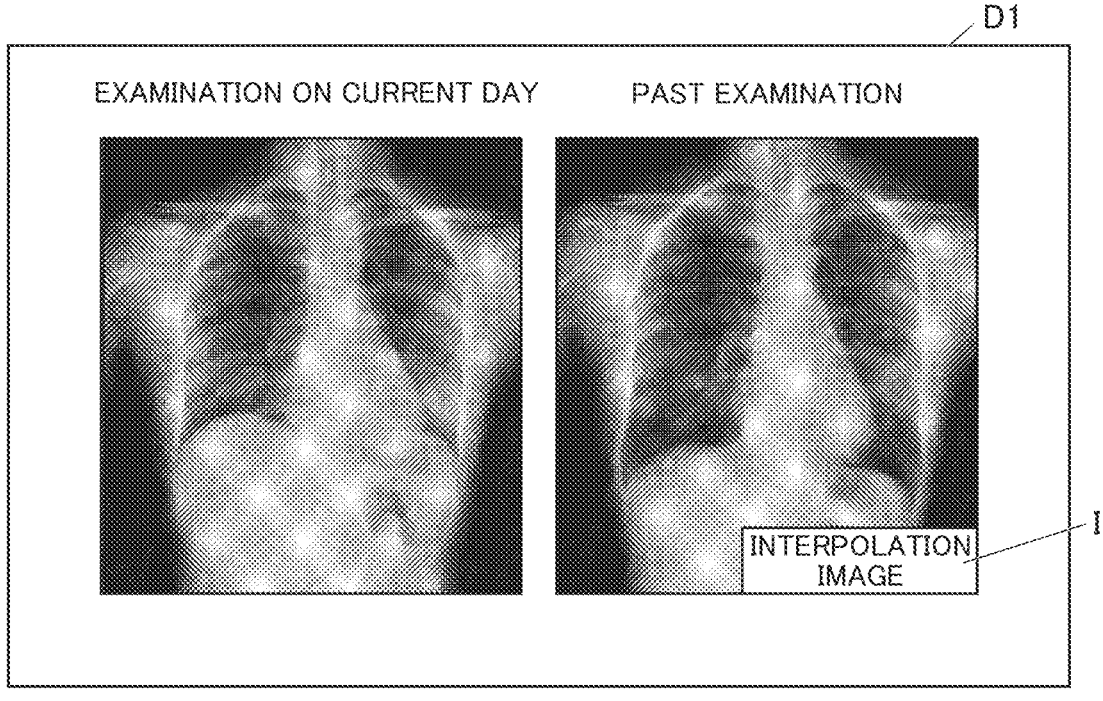
FIG. 4 is an image diagram of a display screen.

Further, when the image (still image) at the timing at which the dynamic image is stopped is the interpolation image, it is displayed that the image is the interpolation image. For example, the controller 31 allows the display part 34 to display as in FIG. 3 or FIG. 4. FIG. 3 and FIG. 4 are image diagrams of a display screen D1 on which the dynamic image of the examination of the current day and the dynamic image of the past examination are displayed side by side. Here, the dynamic image of the current day examination is the first dynamic image, and the dynamic image of the past examination is the second dynamic image. FIG. 3 illustrates a case where an actually captured frame image in the second dynamic image at a certain timing is displayed. FIG. 4 illustrates a case where the interpolation image in the second dynamic image at a certain timing is displayed. In FIG. 4, a display I indicating that the image is the interpolation image is displayed on the display screen D1.

Thus, the user can confirm whether the comparison target is the actually captured frame image or the interpolation image.

[Others]

In the above description, a case in which the first dynamic image is acquired from the storage 32 in step S1 has been described, but the present invention is not limited thereto. For example, the first dynamic image during imaging or after completion of imaging may be acquired from the imaging console 2.

Further, as in the configuration of the dynamic image display system 100 shown in FIG. 1, a plurality of imaging consoles 2 may be connected to the communication network NT, and the first dynamic image and the second dynamic image may be acquired from different imaging consoles 2.

In step S4, the images are displayed on the display part 34, but the present invention is not limited thereto. For example, the images may be displayed on another display device connected via the communication network NT.

Furthermore, the interpolation ratio may be set by the user. For example, in a case where the first frame rate is 40 FPS and the second frame rate is 30 FPS, when the inter-polation ratio is set to 50%, the second frame rate is 35 FPS, and when the interpolation ratio is set to 100%, the second frame rate is 40 FPS.

Effect

As described above, the dynamic image display device (diagnostic console 3) includes: the dynamic image acquirer (controller 31) that acquires the first dynamic image captured at the first frame rate and the second dynamic image captured at the second frame rate lower than the first frame rate; the interpolation image generator (controller 31) that generates the interpolation image between frame images of the second dynamic image to increase the frame rate of the second dynamic image; and the display part 34 comparably displaying the first dynamic image and the second dynamic image that includes the interpolation image.

Furthermore, the interpolation image generator (controller 31) may generate the interpolation image at the same frame rate as the first frame rate.

Therefore, dynamic images at different frame rates can be compared with each other more accurately. Furthermore, the second dynamic image is the dynamic image captured before the first dynamic image and can be compared even if the frame rate is low.

The first dynamic image and the second dynamic image are dynamic images captured by different imaging devices.

Therefore, it is possible to cope with various aspects of the dynamic image display system 100.

The dynamic image display method includes, in the dynamic image display device (diagnostic console 3) that displays dynamic images, the dynamic image acquiring step (step S1 and step S2) of acquiring the first dynamic image captured at the first frame rate and the second dynamic image captured at the second frame rate lower than the first frame rate, the interpolation image generating step (step S3) of generating the interpolation image between frame images of the second dynamic image and increasing the frame rate of the second dynamic image, and a display step (step S4) of comparably displaying the first dynamic image and the second dynamic image that includes the interpolation image.

Therefore, dynamic images at different frame rates can be compared with each other more accurately.

The program causes the computer of the dynamic image display device (diagnostic console 3) to function as the dynamic image acquirer (controller 31) acquiring the first dynamic image captured at the first frame rate and the second dynamic image captured at the second frame rate lower than the first frame rate, the interpolation image generator (controller 31) generating the interpolation image between frame images of the second dynamic image and increasing the frame rate of the second dynamic image, and a display controller (controller 31) comparably displaying the first dynamic image and the second dynamic image that includes the interpolation image on the display part.

Therefore, dynamic images at different frame rates can be compared with each other more accurately.

Note that the description in the present embodiment is an example of a suitable dynamic image display system according to the present invention, and the present invention is not limited to this.

For example, although the case where the present invention is applied to the dynamic image of the chest part has been described as an example in the above-described embodiment, the present invention is not limited thereto and may be applied to the dynamic image obtained by imaging another part.

Although a hard disk, a semiconductor nonvolatile memory, or the like is used in the above description as a computer-readable medium storing the program according to the present invention, the present invention is not limited to this example. Other applicable computer-readable media include portable recording media such as CD-ROM. In addition, a carrier wave is also applied as a medium for providing data of the program according to the present invention via a communication line.

In addition, the detailed configuration and the detailed operation of each device constituting the dynamic image display system 100 can be appropriately changed without departing from the scope of the present invention.

Although embodiments of the present invention have been described and shown in detail, the disclosed embodiments are made for purposes of illustration and example only and not limitation. The scope of the present invention should be interpreted by terms of the appended claims.

The entire disclosure of Japanese Patent Application No. 2023-205182, filed on Dec. 5, 2023, including description, claims, drawings and abstract is incorporated herein by reference.

What is claimed is:

1. A dynamic image display device comprising:
a hardware processor, wherein the hardware processor,
  acquires a first dynamic image captured at a first frame rate and a second dynamic image captured at a second frame rate lower than the first frame rate, and
  generates an interpolation image between each frame image of the second dynamic image and increases a frame rate of the second dynamic image, and
a display that displays the first dynamic image and the second dynamic image that includes the interpolation image in a comparable manner, wherein, in a case where the interpolation image is displayed as a still image, the display performs a display indicating that the image is the interpolation image.

2. The dynamic image display device according to claim 1, wherein the hardware processor generates the interpolation image at a rate equal to the first frame rate.

3. The dynamic image display device according to claim 1, wherein the hardware processor generates the interpolation image based on previous and subsequent frame images.

4. The dynamic image display device according to claim 1, wherein the first dynamic image and the second dynamic image are dynamic images captured by different imaging devices.

5. A dynamic image display device comprising:
a hardware processor, wherein the hardware processor,
  acquires a first dynamic image captured at a first frame rate and a second dynamic image captured at a second frame rate lower than the first frame rate, and generates an interpolation image between each frame image of the second dynamic image and increases a frame rate of the second dynamic image, and
a display that displays the first dynamic image and the second dynamic image that includes the interpolation image in a comparable manner, and displays information indicating that the second dynamic image includes the interpolation image.

6. A dynamic image display method performed in a dynamic image display device that displays a dynamic image, the method comprising:
  acquiring a first dynamic image captured at a first frame rate and a second dynamic image captured at a second frame rate lower than the first frame rate;
  generating an interpolation image between each frame image of the second dynamic image and increasing a frame rate of the second dynamic image; and
  displaying the first dynamic image and the second dynamic image that includes the interpolation image in a comparable manner, wherein, in a case where the interpolation image is displayed as a still image, the displaying indicates that the image is the interpolation image.

7. A non-transitory computer-readable recording medium storing a program that causes a hardware processor of a computer of a dynamic image display device that displays a dynamic image to perform:
  acquiring a first dynamic image captured at a first frame rate and a second dynamic image captured at a second frame rate lower than the first frame rate;
  generating an interpolation image between each frame image of the second dynamic image and increasing a frame rate of the second dynamic image; and
  displaying on a display the first dynamic image and the second dynamic image that includes the interpolation image in a comparable manner, wherein, in a case where the interpolation image is displayed as a still image, the displaying indicates that the image is the interpolation image.

8. The dynamic image display device according to claim 5, wherein, in a case where the interpolation image is displayed as a still image, the display performs a display indicating that the image is the interpolation image.

9. The dynamic image display device according to claim 5, wherein the hardware processor generates the interpolation image at a rate equal to the first frame rate.

10. The dynamic image display device according to claim 5, wherein the hardware processor generates the interpolation image based on previous and subsequent frame images.

11. The dynamic image display device according to claim 5, wherein the first dynamic image and the second dynamic image are dynamic images captured by different imaging devices.

* * * * *